United States Patent
Muenz et al.

(10) Patent No.: US 11,295,254 B2
(45) Date of Patent: Apr. 5, 2022

(54) FLEXIBLE PRODUCT MANUFACTURING PLANNING

(71) Applicant: Siemens Aktiengesellschaft, Munich (DE)

(72) Inventors: Ulrich Muenz, Plainsboro, NJ (US);
Hasan Sinan Bank, Sacramento, CA (US); Emmanouil Tzorakoleftherakis, Homer Glen, IL (US); Michael Jäntsch, Princeton, NJ (US)

(73) Assignee: Siemens Aktiengesellschaft, Munich (DE)

( * ) Notice: Subject to any disclaimer, the term of this patent is extended or adjusted under 35 U.S.C. 154(b) by 114 days.

(21) Appl. No.: 16/495,651

(22) PCT Filed: Sep. 26, 2017

(86) PCT No.: PCT/US2017/053357
§ 371 (c)(1),
(2) Date: Sep. 19, 2019

(87) PCT Pub. No.: WO2018/174940
PCT Pub. Date: Sep. 27, 2018

(65) Prior Publication Data
US 2020/0090095 A1 Mar. 19, 2020

Related U.S. Application Data

(60) Provisional application No. 62/475,919, filed on Mar. 24, 2017.

(51) Int. Cl.
*G06Q 10/06* (2012.01)
*G06Q 50/04* (2012.01)

(52) U.S. Cl.
CPC ....... *G06Q 10/06315* (2013.01); *G06Q 50/04* (2013.01)

(58) Field of Classification Search
CPC .......... G06Q 10/06315; G06Q 50/04
(Continued)

(56) References Cited

U.S. PATENT DOCUMENTS 5,155,677 A * 10/1992 Kurtzberg .......... G05B 13/0205
700/36
7,933,679 B1 * 4/2011 Kulkarni ............ G05B 13/0265
700/173

(Continued)

OTHER PUBLICATIONS

Yihai He "Reliability Modeling and Optimization Strategy for Manufacturing System Based on RQR Chain", Dec. 2015, Hindawi Publishing Corporation Mathematical Problems in Engineering vol. 2015, Article ID 379098, pp. 1-13 (Year: 2015).*

(Continued)

*Primary Examiner* — Romain Jeanty

(57) ABSTRACT

Systems, methods, and computer-readable media are disclosed for planning and scheduling of manufacturing using a receding horizon planning approach that enables the manufacture of multiple products in a flexible and efficient manner. A receding horizon planning engine is provided that receives input data indicative of various manufacturing parameters associated with the manufacture of various products and utilizes the input data to solve an optimization problem with respect to a cost function to generate a receding horizon execution plan indicative of a set of planned manufacturing steps to be executed. Some subset of the planned manufacturing steps (which may include all planned steps) may then be executed. Upon completion of execution of the subset of planned manufacturing steps or upon the occurrence of a trigger event, the optimization problem may be re-solved to obtain a new receding horizon execution plan for a subsequent set of planned manufacturing steps.

20 Claims, 3 Drawing Sheets

(58) Field of Classification Search
USPC .......................................................... 705/7.23
See application file for complete search history.

(56) References Cited

U.S. PATENT DOCUMENTS

| | | | | |
|---|---|---|---|---|
| 8,140,372 B2* | 3/2012 | Chang | ................. | G06Q 10/087 |
| | | | | 705/7.25 |
| 8,639,558 B2* | 1/2014 | Desai | .................... | G06Q 30/02 |
| | | | | 705/7.29 |
| 10,394,195 B2* | 8/2019 | Das | ........................ | G05B 13/04 |
| 2005/0096769 A1* | 5/2005 | Bayoumi | ............... | G06Q 10/04 |
| | | | | 700/99 |
| 2005/0171825 A1* | 8/2005 | Denton | .................. | G06Q 10/06 |
| | | | | 705/7.22 |
| 2009/0192864 A1* | 7/2009 | Song | .................... | G06Q 10/087 |
| | | | | 705/28 |
| 2010/0100216 A1* | 4/2010 | Ames, II | ................ | G06Q 10/04 |
| | | | | 700/103 |
| 2012/0078405 A1 | 3/2012 | Ben-Bassat et al. | | |
| 2012/0198396 A1* | 8/2012 | Kajiwara | ................ | H01L 22/20 |
| | | | | 716/54 |
| 2013/0226648 A1* | 8/2013 | Horch | .............. | G06Q 10/06315 |
| | | | | 705/7.22 |
| 2013/0297367 A1* | 11/2013 | Baramov | ......... | G06Q 10/06312 |
| | | | | 705/7.22 |

OTHER PUBLICATIONS

International Search Report dated Nov. 20, 2017; International Application No. PCT/US2017/053357; Filing Date: Sep. 26, 2017; 13 pages.

* cited by examiner

FLEXIBLE PRODUCT MANUFACTURING PLANNING

CROSS REFERENCE TO RELATED APPLICATIONS

This application is a national phase filing under 35 U.S.C. § 371 of International Patent Application No. PCT/US2017/053357, filed Sep. 26, 2017, which claims the benefit of priority to U.S. Provisional Patent Application Ser. No. 62/475,919, filed Mar. 24, 2017 which are incorporated herein by reference in their entirety.

BACKGROUND

In certain standardized environments, manufacturing planning can be highly automated with little or no variation in manufacturing process flow, processing times, or machine capabilities. Examples of such environments include microelectronic device manufacturing and automobile manufacturing. In such environments, a static manufacturing plan with little variability is typically produced in advance and executed within a manufacturing plant that has been specifically engineered to this plan.

However, in other manufacturing environments, there may be a high degree of variability, in which case, manufacturing planning conventionally requires human planning. In such environments, a manufacturing plan is typically computed manually and subsequently executed until a major disturbance is detected. While certain multi-purpose scheduling algorithms exist, such algorithms suffer from a number of drawbacks. Technical solutions that address these drawbacks are discussed herein.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
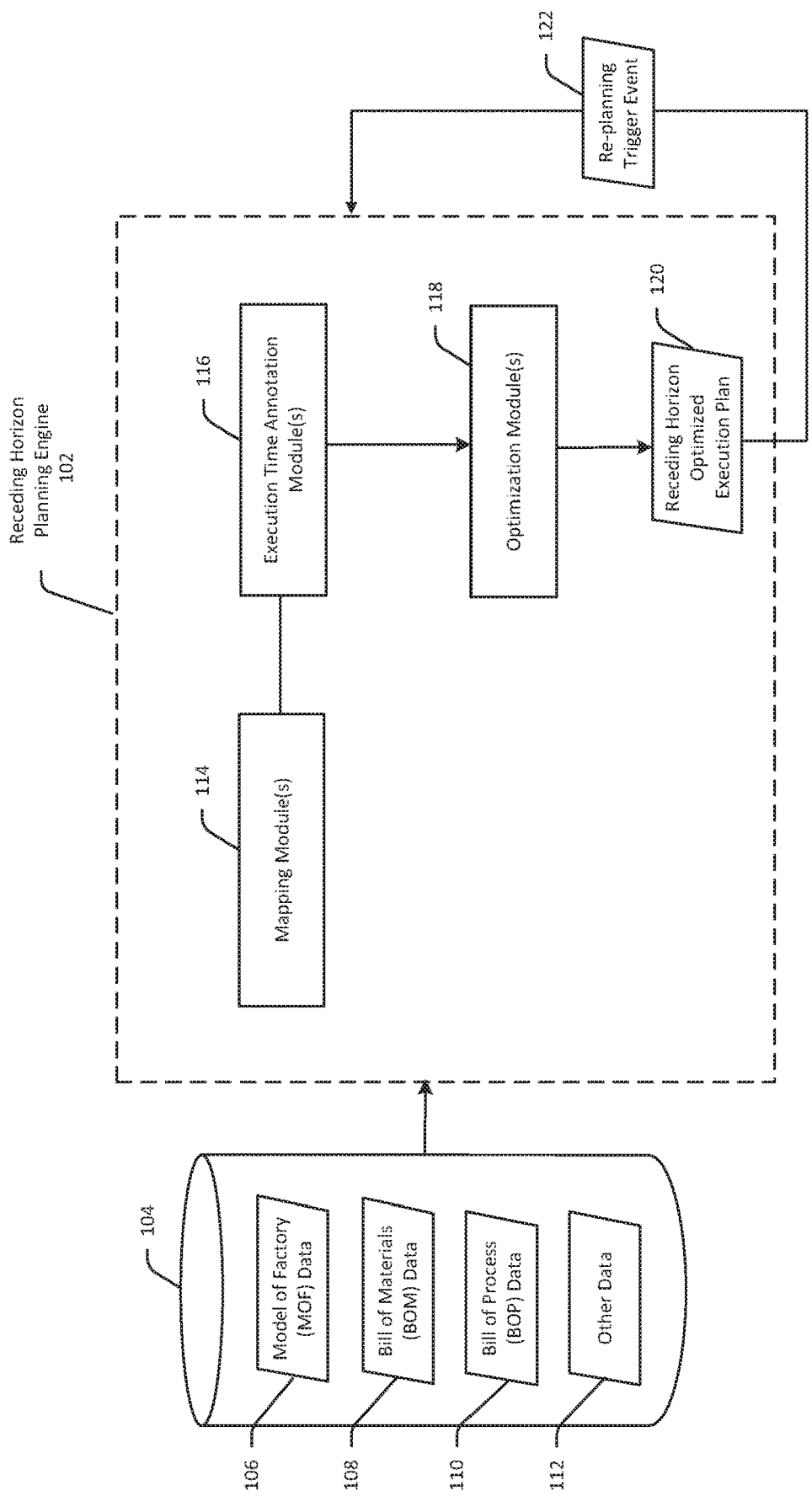
FIG. 1 is a hybrid system component/data flow diagram illustrating a flexible product manufacturing planning process for iteratively generating receding horizon execution plans in accordance with one or more example embodiments of the disclosure.

This disclosure relates to, among other things, devices, servers, systems, methods, computer-readable media, techniques, and methodologies for planning and scheduling of manufacturing using a receding horizon planning approach that enables the manufacture of multiple products in a flexible and efficient manner. In example embodiments of the disclosure, a receding horizon planning engine is provided that receives input data indicative of various manufacturing parameters associated with the manufacture of various products within a manufacturing plant environment and utilizes the input data to solve an optimization problem with respect to a cost function to generate a receding horizon execution plan indicative of a set of planned manufacturing steps to be executed. Some subset of the planned manufacturing steps (which may include all planned steps) may then be executed. Upon completion of execution of the subset of planned manufacturing steps, after certain period of time has elapsed, or upon the occurrence of a trigger event, the optimization problem may be re-solved to obtain a new receding horizon execution plan for a subsequent set of planned manufacturing steps. New receding horizon execution plans may be iteratively generated in this manner for successive future manufacturing steps until an end product is generated.

Certain manufacturing environments are highly automated and experience little or no variability. In such environments, a static manufacturing plan with little flexibility is typically produced in advance and executed within a manufacturing plant environment that has been specifically engineered to this plan. Other manufacturing environments, however, may be prone to a high degree of variability, in which case, conventional manufacturing planning requires manual planning. More specifically, in such environments, a manufacturing plan is typically computed manually and subsequently executed until a major disturbance is detected. This reliance on manual planning—while providing some flexibility—is highly inefficient, particularly with respect to large-scale manufacturing problems. While certain multi-purpose scheduling algorithms exist, such algorithms suffer from a number of drawbacks. In particular, such algorithms require a substantial amount of computing time, lack flexibility, and are not scalable to large-scale manufacturing. In addition, existing planners lack a dynamic planning capability, which limits their integration to real-time or runtime systems.

Example embodiments of the disclosure address the inefficiency of manual manufacturing planning and the inflexibility of scheduling algorithms by utilizing a receding horizon planning approach to manufacturing planning in combination with continuous updating of the input data indicative of manufacturing parameters. This combination enables both a flexible (due to the continuous updates to the input data) and efficient (due to the planning horizon) approach to manufacturing planning. The planning horizon may refer to the number of planned manufacturing steps to be performed subsequent to a current manufacturing state of the product, where the planned manufacturing steps are determined as a result of solving the optimization problem.

In certain example embodiments, the execution horizon may be chosen independently of the planning horizon. The execution horizon may refer to the number of the planned manufacturing steps in the planning horizon that are actually executed before the optimization problem is re-solved as part of a subsequent iteration of the receding horizon planning process disclosed herein. Re-solving the optimization problem upon completion of the execution horizon (or earlier in response to a trigger event as will be described in more detail later in this disclosure) results in a new set of planned manufacturing steps to be executed from a new current manufacturing state of all products in the manufacturing environment and an overall state of the manufacturing environment that is arrived at after execution of one or more planned manufacturing steps from the previous iteration.

Independently selecting the planning horizon and the execution horizon allows for a solution (e.g., a receding horizon execution plan indicative of a set of planned manufacturing steps to be executed) of desired optimality to be obtained, while still providing the flexibility to quickly respond to variability in the manufacturing environment. As the number of planned manufacturing steps in an iteration increases, the performance increases but the flexibility decreases. Conversely, as the number of planned manufacturing steps in an iteration decreases, the flexibility increases but the performance decreases. The ability to independently select the execution horizon from the planning horizon allows for greater flexibility to be achieved without sacrificing optimality by decreasing the number of planned manufacturing steps in an iteration.

As customers desire products with ever greater variability, such manufacturing flexibility is paramount. Examples embodiments of the disclosure provide a dynamic online manufacturing planning method that optimizes a manufacturing process with respect to a cost parameter in a flexible manner that accounts for variability in the manufacturing environment. The dynamic nature of the manufacturing planning method according to example embodiments of the disclosure has the capability to adjust the manufacturing plan dynamically during manufacturing, thereby facilitating integration with real-time or runtime systems. The cost parameter may be a production cost, latency, throughput, energy consumption, product lateness with respect to due dates, or the like. The variability in the manufacturing environment may result from any of a variety of scenarios. For example, a factory may be required to produce a new product without detailed reengineering of the manufacturing process. As another example of variability that may be introduced to the manufacturing environment, a machine may fail during operation or a new machine may be added to a production line during production. As another example, a machine's capabilities may change. For example, a drilling machine may receive drills for drilling steel in addition to existing drills for aluminum. As yet another example, partially manufactured work pieces may fail quality inspections such that certain manufacturing steps may need to be repeated. As still more examples of how variability may be introduced to the working environment, certain manufacturing steps may have uncertain execution times (e.g., a manufacturing step performed by a human); human intervention may occur in the production process (e.g., during production a human may remove some partially manufactured parts); or products may be produced with varying priorities or deadlines. It should be appreciated that the above-described examples of cost parameters and manufacturing variability are merely illustrative and not exhaustive.

Figure 2:
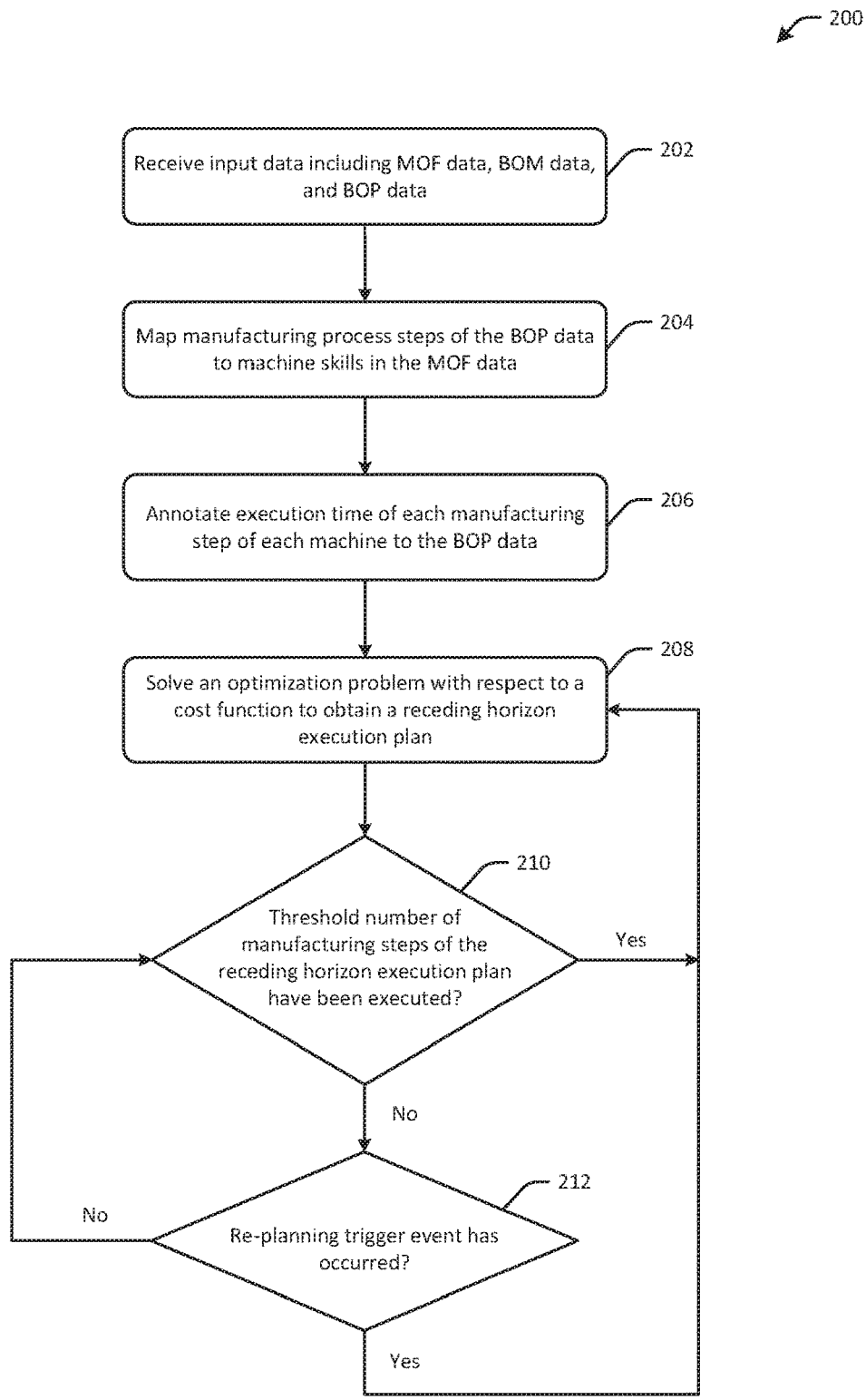
FIG. 2 is a process flow diagram of an illustrative method for iteratively generating receding horizon execution plans in accordance with one or more example embodiments of the disclosure.

FIG. 1 is a hybrid system component/data flow diagram illustrating a flexible product manufacturing planning process for iteratively generating receding horizon execution plans in accordance with one or more example embodiments of the disclosure. FIG. 2 is a process flow diagram of an illustrative method 200 for iteratively generating receding horizon execution plans in accordance with one or more example embodiments of the disclosure. While the method 200 of FIG. 2 may be described with respect to a particular product, it should be appreciated that the method 200 may be performed in parallel for each product produced in a plant such that a receding horizon execution plan is generated for each product. In such cases, the receding horizon execution plans generated for each product may be merged to generate a composite receding horizon execution plan for all products in the manufacturing environment. Such merging may be done in a manner that complies with resource constraints (e.g., product machines that can only produce a single product at a time). FIGS. 1 and 2 will be described in conjunction with one another hereinafter.

Each operation of the method 200 may be performed by one or more components that may be implemented in any combination of hardware, software, and/or firmware. In certain example embodiments, one or more of these component(s) may be implemented, at least in part, as software and/or firmware that contains or is a collection of one or more program modules that include computer-executable instructions that when executed by a processing circuit cause one or more operations to be performed. A system or device described herein as being configured to implement example embodiments of the invention may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring to FIG. 2 in conjunction with FIG. 1, at block 202, a receding horizon planning engine 102 may receive input data indicative of manufacturing parameters associated with the manufacture of one or more products within a manufacturing plant environment. The input data may include, for example, first data 103 (hereinafter referred to as model of factory (MOF) data); second data 108 (hereinafter referred to as bill of materials (BOF) data); and third data 110 (hereinafter referred to as bill of process (BOP) data). The input data may be stored in one or more datastores 104. The datastore(s) 104 may also store a variety of other types of data 112, at least some of which may, in certain example embodiments, form part of the input data received at block 202 of the method 200.

The MOF data 106 may include an identification of all machines present in a manufacturing environment (e.g., a manufacturing plant) as well as an indication of their respective capabilities (also referred to herein as skills). It should be appreciated that different subgroups of machines (with some potential overlap) may be used to generate different end products. The skills of a machine may include the type of materials the machine is capable of operating on, the type of transformation the machine is capable of making in the materials, and so forth. For example, the MOF data 106 may include an identification of a first drilling machine capable of drilling into a first material (e.g., steel) at a maximum depth or diameter and a second drilling machine capable of drilling into a second material (e.g., aluminum) at a different maximum depth or diameter. In certain example embodiments, the skills of different machines may at least partially overlap. For example, the first drilling machine described above may also be capable of drilling aluminum.

In certain example embodiments, the MOF data 106 may also include processing/execution times for various machines. The execution times may be empirically determined or may be machine-learned. For example, the receding horizon planning engine 102 may learn the execution time of a machine for a range of input tasks or the machine may be queried for its execution time during manufacturing. In other example embodiments, the execution times may be stochastic execution times. In addition, in certain example embodiments, the MOF data 106 may also include an indication of relative locations and connections between machines. For example, the MOF data 106 may identify the relative ordering, connections, and locations of machines forming part of a production line in a conveyor belt system. The MOF data 106 may be generated, for example, using a factory engineering, commissioning, or simulation tool.

The BOM data 108 may include an identification of raw materials used to produce each product. The BOM data 108 may include additional information about the raw materials including their availability, location, pricing, etc. The BOP data 110 may include, for each product, a respective graph that describes the manufacturing steps required to transform raw materials (as identified in the BOM data 108) to the end product. The edges of such a graph may represent intermediate products in the manufacture of an end product and the nodes may represent potential successive manufacturing steps. For example, a node in a graph may represent an assembly operation and two edges pointing to the node may represent two intermediate products combined via the assembly operation. A graph associated with a product may be indicative of all possible combinations of manufacturing steps that can be performed to transform raw materials into the product. In certain example embodiments, the representation of the nodes and edges may be reversed such that the nodes represent intermediate products and the edges representing manufacturing steps. The BOM data 108 and/or the BOP data 110 may be generated, for example, using a product computer-aided design (CAD) tool.

As changes occur within the manufacturing environment, updates may be made to any of the MOF data 106, the BOM data 108, and/or the BOP data 110. For example, if a machine is modified to enhance or otherwise modify its skills, the MOF data 106 may be updated. As another example, if a new machine is added to the manufacturing environment or an existing machine is removed, the MOF data 106 may be modified accordingly. In other scenarios, the raw materials used to create a product or their pricing, availability, location, or the like may change, in which case, the BOM data 108 may be updated accordingly. As yet another example, if a new manufacturing step is added to a manufacturing process for creating a product, an existing step is eliminated or modified, an ordering of manufacturing steps is changed, or the like, the BOP data 110 may be updated to reflect this. It should be appreciated that the above examples are merely illustratively and not exhaustive.

The other data 112 may include, for example, data indicative of receding horizon execution plans that have generated. The other data 112 may also include data indicative of the execution horizon that has been selected. In addition, the other data 112 may include data indicative of deviations between planned manufacturing steps and manufacturing steps that are actually executed (e.g., a manufacturing step requires much more time to complete than expected). The other data 112 may also include data relating to cost parameters against which manufacturing planning may be optimized. The cost parameters may include any of those previously described, for example.

Referring again to FIG. 2, at block 204 of the method 200, computer-executable instructions of one or more mapping modules 114 of the receding horizon planning engine 102 may be executed to map manufacturing process steps of the BOP data 110 to machine skills in the MOF data 106. More specifically, for each graph in the BOP data 110 associated with the manufacture of a corresponding product, the mapping module(s) 114 may map individual manufacturing steps (as represented by either nodes or edges in the graph depending on the implementation) to the machines having the corresponding skills (as identified in the MOF data 106) sufficient to execute such steps.

At block 203, computer-executable instructions of one or more execution time annotation module(s) 116 of the receding horizon planning engine 102 may be executed to annotate an execution time of each manufacturing step on each machine to the BOP data 110. That is, a respective execution time required for each machine to perform a corresponding manufacturing step may be determined and linked to that manufacturing step within a corresponding product graph in the BOP data 110. In certain example embodiments, the actual execution times may not be known exactly, in which case, the receding horizon planning engine 102 may be configured to handle stochastic execution times. More specifically, the optimization problem described in more detail hereinafter may become a stochastic optimization problem. Various approaches may be taken to solve such a stochastic optimization problem including, for example, optimization based on worst-case execution times; stochastic optimization of the original problem (e.g., selecting an optimized solution based on a Gaussian distribution of execution times across an entire manufacturing plant); or Monte-Carlo-like sample based optimization where the optimization is solved for a large number of samples in parallel.

At block 208 of the method 200, computer-executable instructions of one or more optimization module(s) 118 of the receding horizon planning engine 102 may be executed to solve an optimization problem with respect to a cost function/parameter on a receding horizon and subject to machine constraints to generate a receding horizon execution plan 120 associated with the manufacture of a product. Machine constraints may include, for example, the constraint that each machine can only manufacture one product at a time. Solving the optimization problem with respect to a cost function/parameter may include, for example, generating a receding horizon execution plan that minimizes manufacturing/production cost, minimizes energy consumption, maximizes product throughput; minimizes product latency; or the like. In certain example embodiments, product priorities and/or product deadlines may be incorporated in the cost function. The optimization problem may be solved using a planning algorithm such as, for example, Branch and Bound, A*, mixed integer linear programming, or the like.

In certain example embodiments, the receding horizon execution plan 120 may indicate a next N planned manufacturing steps for a particular product. In such example embodiments, a receding horizon execution plan may be generated for each product, and the various execution plans may be merged to obtain an execution plan for all products in the manufacturing environment. In other example embodiments, the receding horizon execution plan 120 may indicate a next N planned manufacturing steps for all products in the manufacturing environment. Thus, a receding horizon execution plan may be generated for each product that is currently being produced in the manufacturing environment separately or for all products in unison.

As an example, N=5 indicates that the receding horizon execution plan 120 includes 5 planned manufacturing steps. The planning manufacturing steps may be steps that are planned to be executed from a current state of all products in the manufacturing environment (e.g., factory) and of the factory itself. The N values for different products may differ. In other words, the number of planned manufacturing steps may differ among products.

In order to solve the optimization problem to generate the receding horizon execution plan 120, the optimization module(s) 118 may be executed to determine a current production state of a product based on the input data (e.g., the BOP data 110). All possible future manufacturing steps and the possible resultant production states may be determined. An optimization problem may then be solved to determine an optimal future state on a receding horizon, and thus, a set of planned manufacturing steps to be performed to arrive at the optimal future state on the receding horizon. For example, a branch and bound technique may be used to successively select potential future states that exceed the quality of a current state. This process may continue until the receding horizon is reached (e.g., the N planned manufacturing steps are determined). It should be noted that the optimization procedure may choose the steps that lie within the planning horizon with respect to the objective function.

As previously described, the execution horizon may be selected independently of the determination of the receding horizon execution plan 120. The execution horizon may indicate n number of the N planned manufacturing steps in the receding horizon execution plan 120 that are to be executed, where 1≤n≤N. As previously noted, N may be selected to achieve a desired optimality of the solution, but at the potential expense of flexibility. In particular, the larger N is, the greater the number of planned manufacturing steps, and thus, the greater the performance due to the reduced number of iterations required (reduced number of times the optimization problem must be re-solved). However, a larger N also means there is less flexibility in responding to changes in the manufacturing environment. As such, example embodiments of the disclosure allow for a larger N to be selected obtain increased performance, but a smaller n to be chosen for the number of planned manufacturing steps that are actually executed to provide a desired level of flexibility.

After the receding horizon execution plan 120 is generated, one or more of the planned manufacturing steps identified in the execution plan 120 may be executed/performed. At block 210 of the method 200, computer-executable instructions of the receding horizon planning engine 102 may be executed to determine whether the n number (the execution horizon) of planned manufacturing steps in the receding horizon execution plan 120 (the planning horizon) have been executed. In response to a positive determination at block 210, the method 200 may proceed iteratively from block 208, where the optimization problem may be re-solved to generate a new receding horizon execution plan that identifies a new set of N planned manufacturing steps to be performed from the now current production state that was arrived at by performing the n planned manufacturing steps of the previous iteration. In certain example embodiments, the determination at block 210 may be a determination as to whether a threshold amount of time t has passed since execution of the receding horizon execution plan 120 commenced. That is, whether a new iteration of the flexible planning algorithm is initiated may be based on time rather than whether the n planned steps have been performed. In such example embodiments, the planning horizon may also (but need not be) based on time. That is, in certain example embodiments, the optimization problem may be solved for a certain time T, and the solution may be executed for a time t before re-planning occurs.

On the other hand, in response to a negative determination at block 210, the method 200 may proceed to block 212, where computer-executable instructions of the receding horizon planning engine 102 may be executed to determine whether a re-planning trigger event 122 has occurred. The occurrence of a re-planning trigger event 122 (a positive determination at block 212) may cause the method 200 to iteratively proceed again from block 208, where the optimization problem may be re-solved to generate a new receding horizon execution plan for a future N planned manufacturing steps. The re-planning trigger event 122 may occur prior to completion of the execution of the n planned manufacturing steps.

The re-planning trigger event 122 may be, for example, a threshold level of deviation between planned manufacturing steps and the corresponding manufacturing steps that are actually executed. For example, a re-planning trigger event may occur if the actual execution time for a machine performing a manufacturing step exceeds the expected execution time of the corresponding planned manufacturing step by more than a threshold value. In other example embodiments, the re-planning trigger event 122 may be a change to one or more of the MOF data 106, the BOM data 108, or the BOP data 110. For example, if a machine executing a manufacturing step has failed, been removed, or has had its skills modified, resulting in an update to the MOF data 106, the trigger event 122 may be generated to cause the receding horizon planning engine 102 to re-solve the optimization problem based, at least in part, on the updated MOF data 108. It should be appreciated that in those scenarios in which the trigger event 122 results from updates to one or more of the MOF data 106, the BOM data 108, or the BOP data 110, the method 200 may iteratively proceed from block 202 (rather than from block 208) so that the receding horizon planning engine 102 can receive the updated input data and execute the flexible manufacturing planning on the updated input data. The above description applies to a scenario in which a trigger event 122 has occurred. In those scenarios in which a trigger event 122 has not occurred (e.g., a negative determination at block 212), the method 200 may return to block 210, where a determination may again be made as to whether the n planned manufacturing steps have been performed. The method 200 may iterate between blocks 210 and 212 until either a trigger event occurs or the n planned manufacturing steps have been executed (which itself triggers a new iteration of the process during which the optimization problem is re-solved and a new set of N planned manufacturing steps are identified).

In certain example embodiments, the receding horizon planning engine 102 may be implemented in a centralized fashion. The centralized approach may lead to larger optimization problems, and thus, longer execution times. On the other hand, in certain other example embodiments, the receding horizon planning engine 102 may be implemented in a de-centralized fashion where a separate planning engine is executed for each product, thereby reducing the complexity of the optimization problems. However, the de-centralized approach may also lead to excessive communication between the different planning engines, excessive effort in merging the plans subject to constraints, and/or sub-optimal solutions.

Various approaches may be taken to avoid potential deadlocks or suboptimal solutions because of the limited horizon in the receding horizon planning algorithm. For example, the planning horizon may simply be increased (e.g., increase N). Alternatively, the cost from the end of the horizon until the end product is manufactured (terminal cost)

may be estimated and used to arrive at a solution. In certain example embodiments, the terminal cost may be learned/estimated from previous manufacturing cycles of similar products. More specifically, in certain example embodiments, as part of solving the optimization problem, a cost associated with arriving at a potential future production state of the product may be determined. A terminal cost associated with the potential future production state may then be estimated, and a quality of the potential future production state may be determined based at least in part on the cost and the terminal cost. If the quality falls below a threshold value, the potential future production state may be excluded from the receding horizon execution plan. In addition, in certain example embodiments, terminal costs may be utilized to determine solutions that that are optimal outside of the limited horizon as well.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Figure 3:
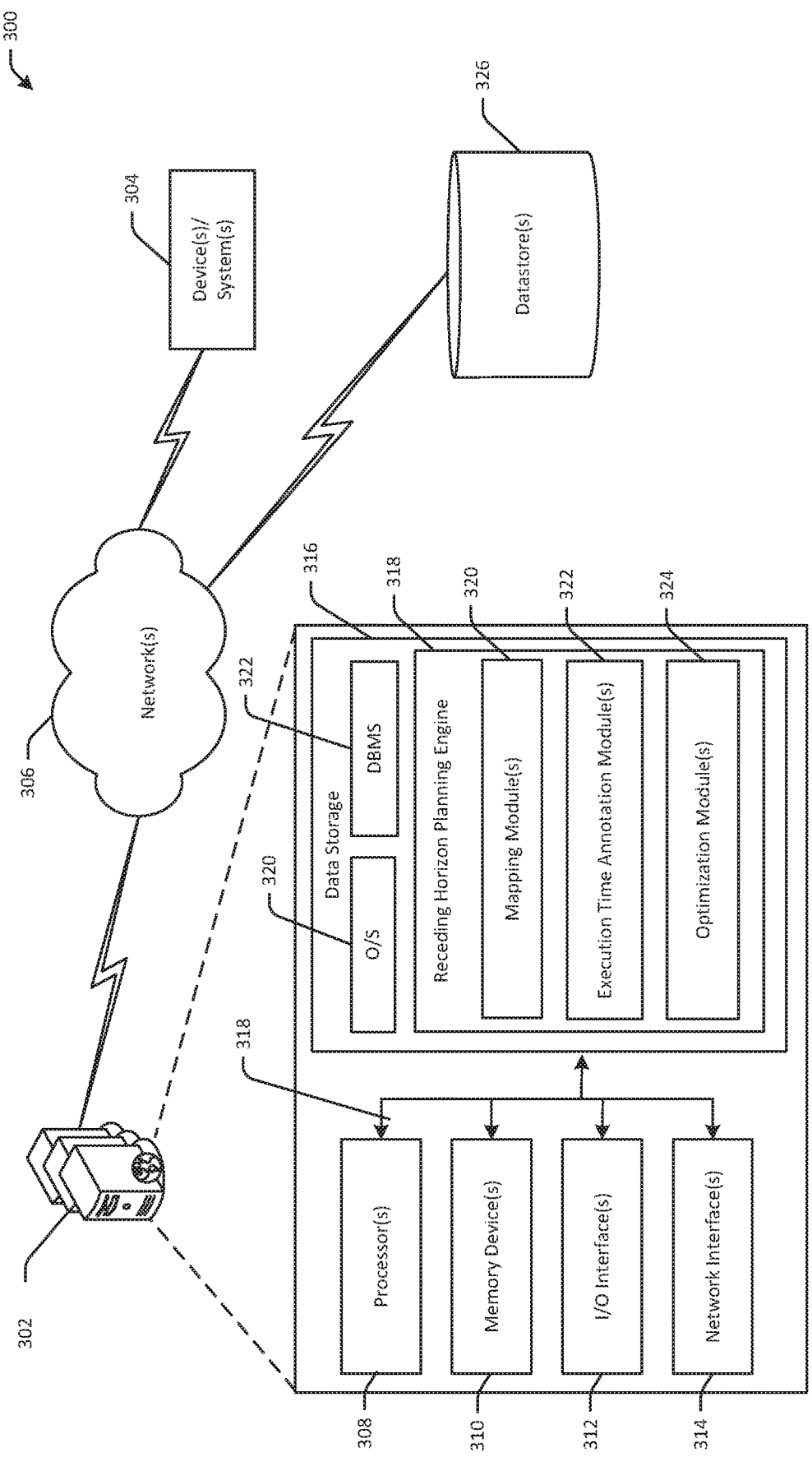
FIG. 3 is a schematic diagram of an illustrative networked architecture in accordance with one or more example embodiments of the disclosure.

FIG. 3 is a schematic diagram of an illustrative networked architecture 300 in accordance with one or more example embodiments of the disclosure. The networked architecture 300 may include one or more optimization servers 302 and one or more other devices/systems 304. While multiple devices/systems 304 and/or multiple servers 302 may form part of the networked architecture 300, these components will be described in the singular hereinafter for ease of explanation. However, it should be appreciated that any functionality described in connection with the server 302 may be distributed among multiple servers 302 and/or among one or more other devices/systems 304. A device or system 304 may include, for example, any of a variety of sensors configured to capture data relating to operational parameters of a machine or process.

The server 302 may be configured to communicate with a device/system 304 (e.g., a machine in a manufacturing environment) via one or more networks 306 which may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 306 may have any suitable communication range associated therewith and may include, for example, global networks (e.g., the Internet), metropolitan area networks (MANs), wide area networks (WANs), local area networks (LANs), or personal area networks (PANs). In addition, the network(s) 306 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 302 may include one or more processors (processor(s)) 308, one or more memory devices 310 (generically referred to herein as memory 310), one or more input/output ("I/O") interface(s) 312, one or more network interfaces 314, and data storage 316. The server 302 may further include one or more buses 318 that functionally couple various components of the server 302. These various components will be described in more detail hereinafter.

The bus(es) 318 may include at least one of a system bus, a memory bus, an address bus, or a message bus, and may permit exchange of information (e.g., data (including computer-executable code), signaling, etc.) between various components of the server 302. The bus(es) 318 may include, without limitation, a memory bus or a memory controller, a peripheral bus, an accelerated graphics port, and so forth. The bus(es) 318 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 310 of the server 302 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 310 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 310 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 316 may include removable storage and/or non-removable storage including, but not limited to, magnetic storage, optical disk storage, and/or tape storage. The data storage 316 may provide non-volatile storage of computer-executable instructions and other data. The memory 310 and the data storage 316, removable and/or non-removable, are examples of computer-readable storage media (CRSM) as that term is used herein.

The data storage 316 may store computer-executable code, instructions, or the like that may be loadable into the memory 310 and executable by the processor(s) 308 to cause the processor(s) 308 to perform or initiate various operations. The data storage 316 may additionally store data that may be copied to memory 310 for use by the processor(s) 308 during the execution of the computer-executable instructions. Moreover, output data generated as a result of execution of the computer-executable instructions by the processor(s) 308 may be stored initially in memory 310, and may ultimately be copied to data storage 316 for non-volatile storage.

More specifically, the data storage 316 may store one or more operating systems (O/S) 320; one or more database management systems (DBMS) 322; and one or more program modules, applications, engines, computer-executable code, scripts, or the like such as, for example, receding horizon planning engine 318, which may, in turn, include one or more sub-modules such as, for example, one or more mapping modules 320, one or more execution time annotation modules 322, and one or more optimization modules 324. Any of the components depicted as being stored in data storage 316 may include any combination of software, firmware, and/or hardware. The software and/or firmware may include computer-executable code, instructions, or the like that may be loaded into the memory 310 for execution by one or more of the processor(s) 308 to perform any of the operations described earlier in connection with correspondingly named modules.

The networked architecture 300 may further include one or more datastores 326 accessible via the network(s) 306 by the server 302 and other devices/systems 304. The datastore(s) 326 may include the datastore(s) 104 shown in FIG. 1 and any of the data depicted as being stored therein. The datastore(s) 326 may include, but are not limited to, databases (e.g., relational, object-oriented, etc.), file systems, flat files, distributed datastores in which data is stored on more than one node of a computer network, peer-to-peer network datastores, or the like.

The data storage 316 may further store various types of data utilized by components of the server 302 such as, for example, any of the data stored in the datastore(s) 326. Any data stored in the data storage 316 may be loaded into the memory 310 for use by the processor(s) 308 in executing computer-executable code. In addition, any data stored in the datastore(s) 326 may be accessed via the DBMS 322 and loaded in the memory 310 for use by the processor(s) 308 in executing computer-executable code.

The processor(s) 308 may be configured to access the memory 310 and execute computer-executable instructions loaded therein. For example, the processor(s) 308 may be configured to execute computer-executable instructions of the various program modules, applications, engines, or the like of the server 302 to cause or facilitate various operations to be performed in accordance with one or more embodiments of the disclosure. The processor(s) 308 may include any suitable processing unit capable of accepting data as input, processing the input data in accordance with stored computer-executable instructions, and generating output data. The processor(s) 308 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 308 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 308 may be capable of supporting any of a variety of instruction sets.

Referring now to other illustrative components depicted as being stored in the data storage 316, the O/S 320 may be loaded from the data storage 316 into the memory 310 and may provide an interface between other application software executing on the server 302 and hardware resources of the server 302. More specifically, the O/S 320 may include a set of computer-executable instructions for managing hardware resources of the server 302 and for providing common services to other application programs (e.g., managing memory allocation among various application programs). In certain example embodiments, the O/S 320 may control execution of one or more of the program modules depicted as being stored in the data storage 316. The O/S 320 may include any operating system now known or which may be developed in the future including, but not limited to, any server operating system, any mainframe operating system, or any other proprietary or non-proprietary operating system.

The DBMS 322 may be loaded into the memory 310 and may support functionality for accessing, retrieving, storing, and/or manipulating data stored in the memory 310, data stored in the datastore(s) 326, and/or data stored in the data storage 316. The DBMS 322 may use any of a variety of database models (e.g., relational model, object model, etc.) and may support any of a variety of query languages. The DBMS 322 may access data represented in one or more data schemas and stored in any suitable data repository.

Referring now to other illustrative components of the server 302, the input/output (I/O) interface(s) 312 may facilitate the receipt of input information by the server 302 from one or more I/O devices as well as the output of information from the server 302 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server 302 or may be separate. The I/O devices may further include, for example, any number of peripheral devices such as data storage devices, printing devices, and so forth.

The I/O interface(s) 312 may also include an interface for an external peripheral device connection such as universal serial bus (USB), FireWire, Thunderbolt, Ethernet port or other connection protocol that may connect to one or more networks. The I/O interface(s) 312 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The server 302 may further include one or more network interfaces 314 via which the server 302 may communicate with any of a variety of other systems, platforms, networks, devices, and so forth. The network interface(s) 314 may enable communication, for example, with another device/system 304 and/or the data store(s) 330 via the network(s) 303.

Referring now to the other system/device 304, in an illustrative configuration, the system/device 304 may include similar hardware and/or software components as those depicted in connection with the illustrative configuration of the server 302. Further, the system/device 304 may be or include one or more sensors/sensor interfaces that may include or may be capable of interfacing with any suitable type of sensing device such as, for example, inertial sensors, force sensors, thermal sensors, optical sensors, time-of-flight sensors, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 3 as being stored in the data storage 316 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the server 302, the device/system 304, and/or hosted on other computing device(s) accessible via one or more of the network(s) 303, may be provided to support functionality provided by the program modules, applications, or computer-executable code depicted in FIG. 3 and/or additional or alternate functionality. Further, functionality may be modularized differently such that processing described as being supported collectively by the collection of program modules depicted in FIG. 3 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 3 may be implemented, at least partially, in hardware and/or firmware across any number of devices.

It should further be appreciated that the server 302 may include alternate and/or additional hardware, software, or firmware components beyond those described or depicted without departing from the scope of the disclosure. More particularly, it should be appreciated that software, firmware, or hardware components depicted as forming part of the server 302 are merely illustrative and that some components may not be present or additional components may be provided in various embodiments. While various illustrative program modules have been depicted and described as software modules stored in data storage 316, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of any of the methods 400 and/or 500 may be performed by a server 302, by another device/system 304, or in a distributed fashion by a server 302 and such a device/system, where the server 302 may have the illustrative configuration depicted in FIG. 3, or more specifically, such operation(s) may be performed by one or more engines, program modules, applications, or the like executable on such device(s). It should be appreciated, however, that such operations may be implemented in connection with numerous other device configurations.

The operations described and depicted in the illustrative methods of FIGS. 4 and 5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 4 and 5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for controlling a product manufacturing process, comprising:
receiving, by a processor, input data indicative of manufacturing parameters associated with manufacturing a product;
solving, by the processor, using the input data, an optimization problem with respect to a cost function to obtain, as a result, a receding horizon execution plan indicative of a planned set of manufacturing steps for manufacturing the product;
determining, by the processor, a subset of manufacturing steps of the planned set of manufacturing steps to execute;

executing the subset of manufacturing steps;
re-solving, by the processor, the optimization problem with respect to the cost function to obtain, as a result, a new receding horizon execution plan indicative of a new planned set of manufacturing steps for manufacturing the product responsive, at least in part, to execution of the subset of manufacturing steps or occurrence of a re-planning trigger event; and
repeating, by the processor, the steps of determining a new subset of manufacturing steps, of executing the new subset of manufacturing steps and of re-solving the optimization problem based on the new planned set of manufacturing steps to manufacture an end product by iteratively applying the results of repeatedly solving the optimization problem, wherein a number (n) of manufacturing steps in the subset of manufacturing steps that are actually executed is independent of a number (N) of planned set of manufacturing steps to execute, such that 1≤n≤N.

2. The method of claim 1, wherein the input data comprises first data indicative of machines in a manufacturing environment and respective capabilities of each of the machines, second data indicative of raw materials used to manufacture the product, and third data indicative of manufacturing steps for transforming the raw materials into the product.

3. The method of claim 2, wherein the third data comprises a graph having edges representative of the manufacturing steps and nodes representative of intermediate products generated during manufacturing of the product.

4. The method of claim 2, further comprising mapping, by the processor, the edges of the graph to the respective capabilities of a group of the machines used to manufacture the product.

5. The method of claim 2, wherein the trigger event comprises at least one of: i) deviation between the subset of planned manufacturing steps and corresponding executed manufacturing steps or ii) modification to at least one of the first data, second data, or third data.

6. The method of claim 2, further comprising annotating, by the processor, the third data with a respective execution time of each of the machines.

7. The method of claim 1, wherein solving the optimization problem by the processor comprises:
determining a cost associated with arriving at a potential future production state of the product;
estimating a terminal cost associated with the potential future production state;
determining a quality of the potential future production state based at least in part on the cost and the terminal cost; and
excluding the potential future production state from the receding horizon execution plan based at least in part on the determined quality.

8. A system for controlling a product manufacturing process, comprising:
at least one memory storing computer-executable instructions; and
at least one processor configured to access the at least one memory and execute the computer-executable instructions to:
receive input data indicative of manufacturing parameters associated with manufacturing a product;
solve, using the input data, an optimization problem with respect to a cost function to obtain, as a result, a receding horizon execution plan indicative of a planned set of manufacturing steps for manufacturing the product;
determine a subset of manufacturing steps of the planned set of manufacturing steps to execute;
execute the subset of manufacturing steps;
re-solve the optimization problem with respect to the cost function to obtain, as a result, a new receding horizon execution plan indicative of a new planned set of manufacturing steps for manufacturing the product responsive, at least in part, to execution of the subset of manufacturing steps or occurrence of a re-planning trigger event; and
repeat the steps of determining a new subset of manufacturing steps, of executing the new subset of manufacturing steps and of re-solving the optimization problem based on the new planned set of manufacturing steps to manufacture an end product by iteratively applying the results of repeatedly solving the optimization problem, wherein a number (n) of manufacturing steps in the subset of manufacturing steps that are actually executed is independent of a number (N) of planned set of manufacturing steps to execute, such 1≤n≤N.

9. The system of claim 8, wherein the input data comprises first data indicative of machines in a manufacturing environment and respective capabilities of each of the machines, second data indicative of raw materials used to manufacture the product, and third data indicative of manufacturing steps for transforming the raw materials into the product.

10. The system of claim 9, wherein the third data comprises a graph having edges representative of the manufacturing steps and nodes representative of intermediate products generated during manufacturing of the product.

11. The system of claim 9, wherein the at least one processor is further configured to execute the computer-executable instructions to map the edges of the graph to the respective capabilities of a group of the machines used to manufacture the product.

12. The system of claim 9, wherein the trigger event comprises at least one of: i) deviation between the subset of planned manufacturing steps and corresponding executed manufacturing steps or ii) modification to at least one of the first data, second data, or third data.

13. The system of claim 9, wherein the at least one processor is further configured to execute the computer-executable instructions to annotate the third data with a respective execution time of each of the machines.

14. The system of claim 8, wherein the at least one processor is configured to solve the optimization problem by executing the computer-executable instructions to:
determine a cost associated with arriving at a potential future production state of the product;
estimate a terminal cost associated with the potential future production state;
determine a quality of the potential future production state based at least in part on the cost and the terminal cost; and
exclude the potential future production state from the receding horizon execution plan based at least in part on the determined quality.

15. A computer program product comprising a storage medium readable by a processing circuit, the storage medium storing instructions executable by the processing circuit to cause a method to be performed, the method comprising:

receiving input data indicative of manufacturing parameters associated with manufacturing a product;

solving, using the input data, an optimization problem with respect to a cost function to obtain a receding horizon execution plan indicative of a planned set of manufacturing steps for manufacturing the product;

determining a subset of manufacturing steps of the planned set of manufacturing steps to execute;

executing the subset of manufacturing steps;

re-solving the optimization problem with respect to the cost function to obtain, as a result, a new receding horizon execution plan indicative of a new planned set of manufacturing steps for manufacturing the product responsive, at least in part, to execution of the subset of manufacturing steps or occurrence of a re-planning trigger event; and repeating the steps of determining a new subset of manufacturing steps, of executing the new subset of manufacturing steps and of re-solving the optimization problem based on the new planned set of manufacturing steps to manufacture an end product by iteratively applying the results of repeatedly solving the optimization problem, wherein a number (n) of manufacturing steps in the subset of manufacturing steps that are actually executed is independent of a number (N) of planned set of manufacturing steps to execute, such that $1 \leq n \leq N$.

16. The computer program product of claim 15, wherein the input data comprises first data indicative of machines in a manufacturing environment and respective capabilities of each of the machines, second data indicative of raw materials used to manufacture the product, and third data indicative of manufacturing steps for transforming the raw materials into the product.

17. The computer program product of claim 13, wherein the third data comprises a graph having edges representative of the manufacturing steps and nodes representative of intermediate products generated during manufacturing of the product.

18. The computer program product of claim 13, further comprising mapping the edges of the graph to the respective capabilities of a group of the machines used to manufacture the product.

19. The computer program product of claim 13, wherein the trigger event comprises at least one of: i) deviation between the subset of planned manufacturing steps and corresponding executed manufacturing steps or ii) modification to at least one of the first data, second data, or third data.

20. The computer program product of claim 13, further comprising annotating the third data with a respective execution time of each of the machines.

* * * * *